United States Patent
O'Leary et al.

(10) Patent No.: US 9,864,787 B2
(45) Date of Patent: Jan. 9, 2018

(54) PARALLEL HYPOTHESIS FORMATION FOR MULTIPLE HYPOTHESES TRACKING

(71) Applicant: Raytheon Company, Waltham, MA (US)

(72) Inventors: Bryan O'Leary, Redondo Beach, CA (US); Matthew L. Benjamin, Playa Vista, CA (US)

(73) Assignee: Raytheon Company, Waltham, MA (US)

( * ) Notice: Subject to any disclaimer, the term of this patent is extended or adjusted under 35 U.S.C. 154(b) by 402 days.

(21) Appl. No.: 14/601,971

(22) Filed: Jan. 21, 2015

(65) Prior Publication Data

US 2016/0335561 A1 Nov. 17, 2016

(51) Int. Cl.
*G06F 17/30* (2006.01)
*G06N 5/00* (2006.01)

(52) U.S. Cl.
CPC .... *G06F 17/30554* (2013.01); *G06F 17/3053* (2013.01); *G06F 17/30598* (2013.01); *G06N 5/003* (2013.01)

(58) Field of Classification Search
CPC .......... G06F 17/3053; G06F 17/30554; G06F 17/30598; G06N 5/003; G06N 7/005; G06N 99/005
USPC ................................ 707/737, 749, 764, 780
See application file for complete search history.

(56) References Cited

U.S. PATENT DOCUMENTS

| | | | |
|---|---|---|---|
| 5,355,325 A * | 10/1994 | Uhlmann | G01S 13/726 342/189 |
| 5,765,166 A | 6/1998 | Gotfried et al. | |
| 8,515,881 B2 | 8/2013 | Schwoegler et al. | |
| RE44,807 E | 3/2014 | Poore, Jr. | |
| 9,229,102 B1 * | 1/2016 | Wright | G01S 13/888 |
| 2009/0312985 A1 * | 12/2009 | Eliazar | G06N 99/005 702/187 |
| 2010/0228778 A1 * | 9/2010 | MacLaurin | G06F 11/302 707/780 |
| 2012/0010853 A1 * | 1/2012 | Ploplys | G06N 99/005 702/181 |

(Continued)

OTHER PUBLICATIONS

Hunter, Hughes, et al. "A Comparison of Semi-Greedy Multiple Hypothesis Methods in the Radar Data Association Problem", IEEE Aerospace Conference, Mar. 2014.

*Primary Examiner* — Greta Robinson
(74) *Attorney, Agent, or Firm* — Burns & Levinson, LLP; Joseph M. Maraia

(57) ABSTRACT

In an embodiment, a method finds an optimal set within collected data objects, each having a score and a list of incompatible objects. The method can include initializing a plurality of sets. Each set has compatible data objects. The method further includes raising the score of the plurality of sets by repeatedly adding compatible subsets of data objects to the plurality of sets. The plurality of sets have a higher score after adding the compatible subsets. The compatible subsets are created by (a) at each of multiple processors, generating a list of subsets of the collected data objects by loading the list of sets from a memory and testing data objects of the subsets for compatibility for each set, and (b) calculating a score for each subset in the list, each processor calculating the score for a particular subset in the generated list in parallel. The method further includes selecting a group of subsets having a highest score.

18 Claims, 8 Drawing Sheets

(56) References Cited

U.S. PATENT DOCUMENTS

| | | |
|---|---|---|
| 2013/0234882 A1 | 9/2013 | Plopys et al. |
| 2013/0275034 A1 | 10/2013 | Cronin et al. |
| 2014/0191899 A1* | 7/2014 | Pickle ............... G01S 13/726 342/175 |
| 2015/0005030 A1* | 1/2015 | Pennanen ............ G06N 99/005 455/556.1 |

* cited by examiner

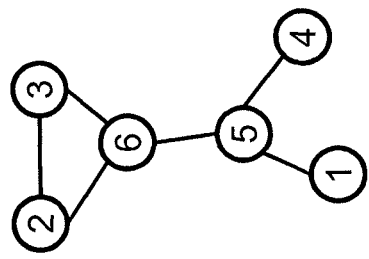
|   | 1 | 2 | 3 | 4 | 5 | 6 |
|---|---|---|---|---|---|---|
| 1 | 1 | 0 | 0 | 0 | 1 | 0 |
| 2 | 0 | 1 | 1 | 0 | 0 | 1 |
| 3 | 0 | 1 | 1 | 0 | 0 | 1 |
| 4 | 0 | 0 | 0 | 1 | 1 | 0 |
| 5 | 1 | 0 | 0 | 1 | 1 | 1 |
| 6 | 0 | 1 | 1 | 0 | 1 | 1 |
Matrix Representation 202
Graphical Representation 252
Fig. 2A     200
Fig. 2B     250

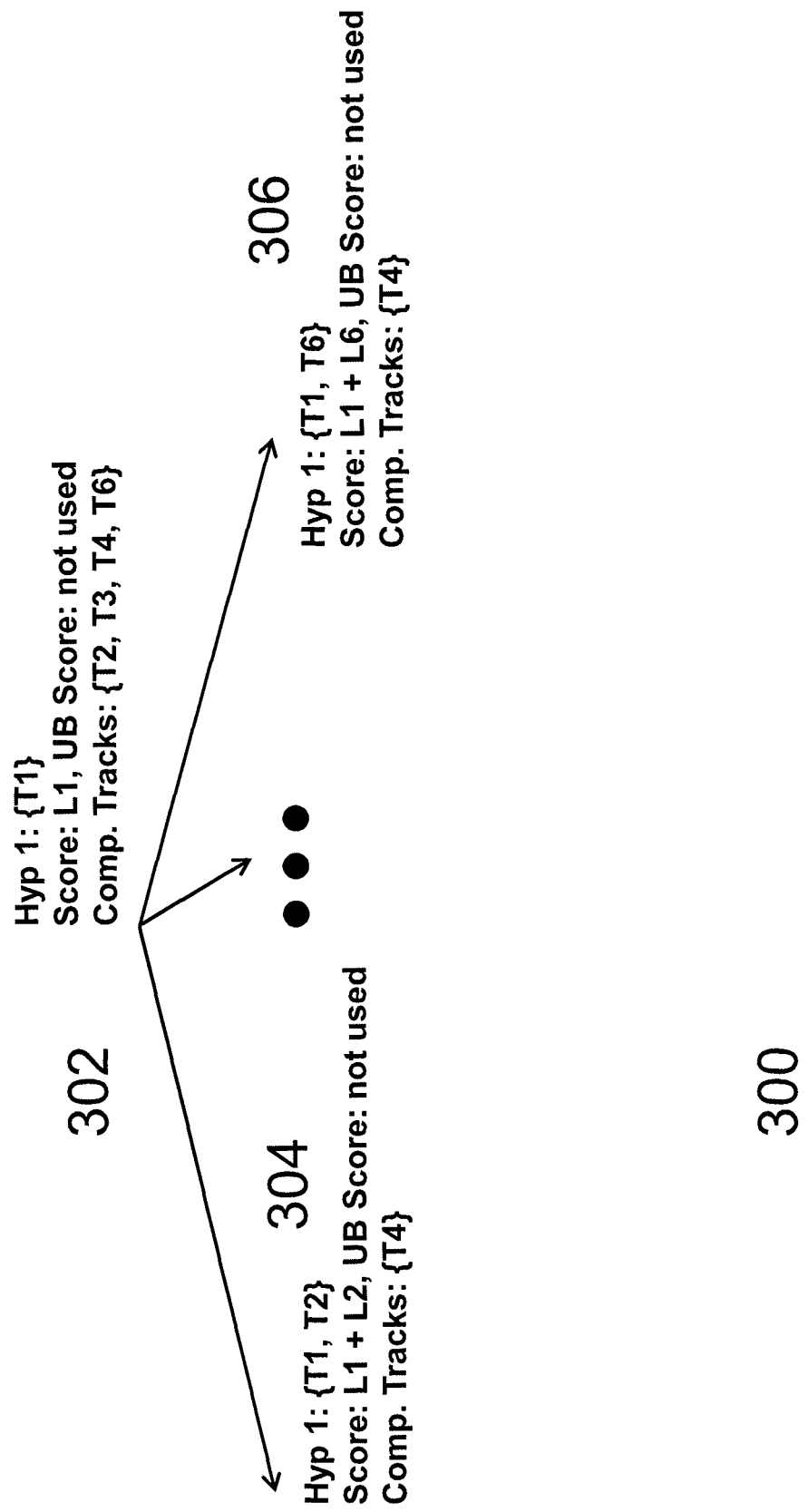

PARALLEL HYPOTHESIS FORMATION FOR MULTIPLE HYPOTHESES TRACKING

BACKGROUND

Multiple hypothesis tracking (MHT) is utilized to track multiple targets at the same time. MHT is generally described by Samuel S. Blackman in Multiple Hypothesis Tracking for Multiple Target Tracking, IEEE A&E Systems Magazine, Vol. 19, No. 1, January 2004, pages 5-18. In some scenarios, a plurality of targets is tracked via a long-term track-oriented approach for hypothesis management which reconstitutes the long-term track hypotheses. The reconstitution of global hypotheses in the long-term track-oriented approach is time consuming and the performance of this step significantly impacts MHT tracking performance. Furthermore, the reconstitution of global hypotheses within the track-based MHT is an NP-hard problem, and previous approaches (e.g., breadth-first search, depth-first search, etc.) are ad-hoc and do not provide performance guarantees.

SUMMARY

In an embodiment, a method can find an optimal set within collected data objects. Each particular data object has a score and has a list of objects that are incompatible with that particular data object. The method can include initializing a plurality of sets. Each set has one or more compatible data objects. The method further includes raising the score of the plurality of sets by repeatedly adding compatible subsets of data objects to the plurality of sets. The compatible subsets are created by (a) at each of the plurality of processors, generating a list of subsets of the collected data objects by loading the list of sets from a memory and testing data objects of the subsets for compatibility for each set, and (b) calculating a score for each subset in the generated list, each one of the plurality of processors calculating the score for a particular subset in the generated list in parallel. The method further includes selecting a group of subsets having a highest score.

In an embodiment, the method also includes returning a particular number of highest scoring sets.

In an embodiment, repeatedly adding compatible subsets of data objects to the plurality of sets further includes generating the list of subsets by generating each list of subsets at one of a plurality of hardware processors and calculating the score for each list of subsets by the one of the plurality of processors in parallel.

In an embodiment, the group of subsets is a group of two or more sets.

In an embodiment, the method includes, from a core processor, sending each subset of sets to a particular one of the plurality of processors to score.

In an embodiment, the method includes, by each one of the plurality of processors, retrieving from the memory a particular subset of sets to score.

In an embodiment, the method includes collecting the data from one of the group of a radar, an infra-red sensor, an electrical-optical sensor, an acoustic sensor, and a sonar detecting at least one object, the data representing locations of the at least one object. Each subset of sets represent a possible track of the at least one object.

In an embodiment, the plurality of processors share a common read-only memory for the data scores and compatibility lists.

In an embodiment, the subsets are pairs having two data objects.

In an embodiment, a system finds an optimal set within collected data objects. Each particular data object can have a score and have a list of objects that are incompatible with that particular data object. The system includes an initialization module configured to initialize a plurality of sets. Each set has one or more compatible data objects. The system further includes a score optimization module having a plurality of processors configured to raise the score of the plurality of sets by repeatedly adding compatible subsets of data objects to the plurality of sets. The score optimization module creates the compatible subsets by (a) generating a list of subsets of the collected data objects by loading the list of sets from a memory and testing data objects of the subsets for compatibility, with a plurality of hardware processors, for each set, and (b) calculating a score for each subset in the generated list, calculating each subset score on a plurality of processors in parallel. The system further includes a group selection module configured to select a group of subsets having a highest score.

In an embodiment, the system includes an output module configured to return a particular number of highest scoring sets.

In an embodiment, the score optimization module is further configured to repeatedly add compatible subsets of data objects to the plurality of sets by generating the list of subsets by generating each list of subsets at one of a plurality of hardware processors and calculating the score for each list of subsets by the one of the plurality of processors in parallel.

In an embodiment, the group of subsets is a group of two or more sets.

In an embodiment, the system further includes a core processor configured to send each subset of sets to a particular one of the plurality of processors to score.

In an embodiment, each one of the plurality of processors is configured to retrieve from the memory a particular pair of sets to score.

In an embodiment, the system further comprises at least one of a radar, infra-red sensor, electrical-optical sensor, acoustic sensor and sonar detecting at least one object configured to collect the data. The data represents locations of the at least one object. Each subset of sets represent a possible track of the at least one object.

In an embodiment, the plurality of processors share a memory.

In an embodiment, the subsets are pairs having two data objects.

In an embodiment, a non-transitory computer-readable medium having computer-readable program codes embedded thereon includes instructions for causing a processor to execute a method of finding an optimal set within collected data objects. Each particular data object has a score and a list of objects that are incompatible with that particular data object. The instructions cause the one or more processors to initialize a plurality of sets, each set having one or more compatible data objects. The instructions further cause the processor to raise the score of the plurality of sets by repeatedly adding compatible subsets of data objects to the plurality of sets. The compatible subsets are created by: (a) generating a list of subsets of the collected data objects by loading the list of sets from a memory and testing data objects of the subsets for compatibility, with a plurality of hardware processors, for each set, and (b) calculating a score for each subset in the generated list, calculating each subset score on a plurality of processors in parallel. The instructions further cause the processor to select a group of scoring subsets having a highest score.

In an embodiment, the non-transitory computer readable medium further causes the processor to returning a particular number of highest scoring sets.

In an embodiment, the group of subsets is a group of two or more sets.

In an embodiment, the instructions further include sending, from a core processor, each subset of sets to a particular one of the plurality of processors to score.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2A is diagram illustrating a matrix representation of track compatibility.

FIG. 2B is a diagram illustrating a graphical representation of the track compatibility corresponding to the matrix representation of FIG. 2A.

FIG. 3 is a diagram illustrating an example embodiment of expanding a hypothesis using a tree data structure, based on the track compatibility/incompatibility shown in FIGS. 2A-B.

DETAILED DESCRIPTION

The reconstitution of global hypotheses in the track-based multiple hypothesis tracking (MHT) method and apparatus includes technology that, generally, tracks sensor hits (also referred to as track data) (e.g., radar tracking, sonar tracking, video tracking, etc.) to generate paired segments of possible target object tracks and transition probabilities between each paired segment (e.g., the probability that a long-term track includes the two paired segments, the probability that the two paired segments would transition between each other, etc.). The technology can utilize the paired segments and transition probabilities to generate long-term tracks of the target objects (e.g., a car goes from point A to B to C to D, an airplane goes from a first set of coordinates and travels through ten additional sets of coordinates, etc.). The technology is utilized to efficiently and accurately track multiple moving targets and the results of the technology (e.g., target object tracks, track identification, etc.) can be utilized for a plurality of applications (e.g., navigation, communication, defensive application, offensive application, etc.).

In MHT, and in other contexts, it can be advantageous to find a best, or highest scoring, set of data based on a collected data objects (e.g., data collected from a sensor). This can be referred to as a restricted knapsack problem, or a maximum weighted independent set (MWIS) problem. An independent set is a set of vertices in a graph (e.g., a graph data structure), no two of which are adjacent. In other words, it is a set of vertices of a graph having no edges connecting any of the vertices in the set. A maximum independent set is an independent set of a largest possible size for a given graph. The maximum independent set problem is a special case of the maximum weighted independent set problem, where all of the weights of its vertices are set to a same constant (e.g., 1). Therefore, the maximum weighted independent set problem receives an undirected graph with varying weights on its vertices and outputs an independent set with maximum total weight. This is considered the "best set" of the data presented in the graph.

Figure 1A:
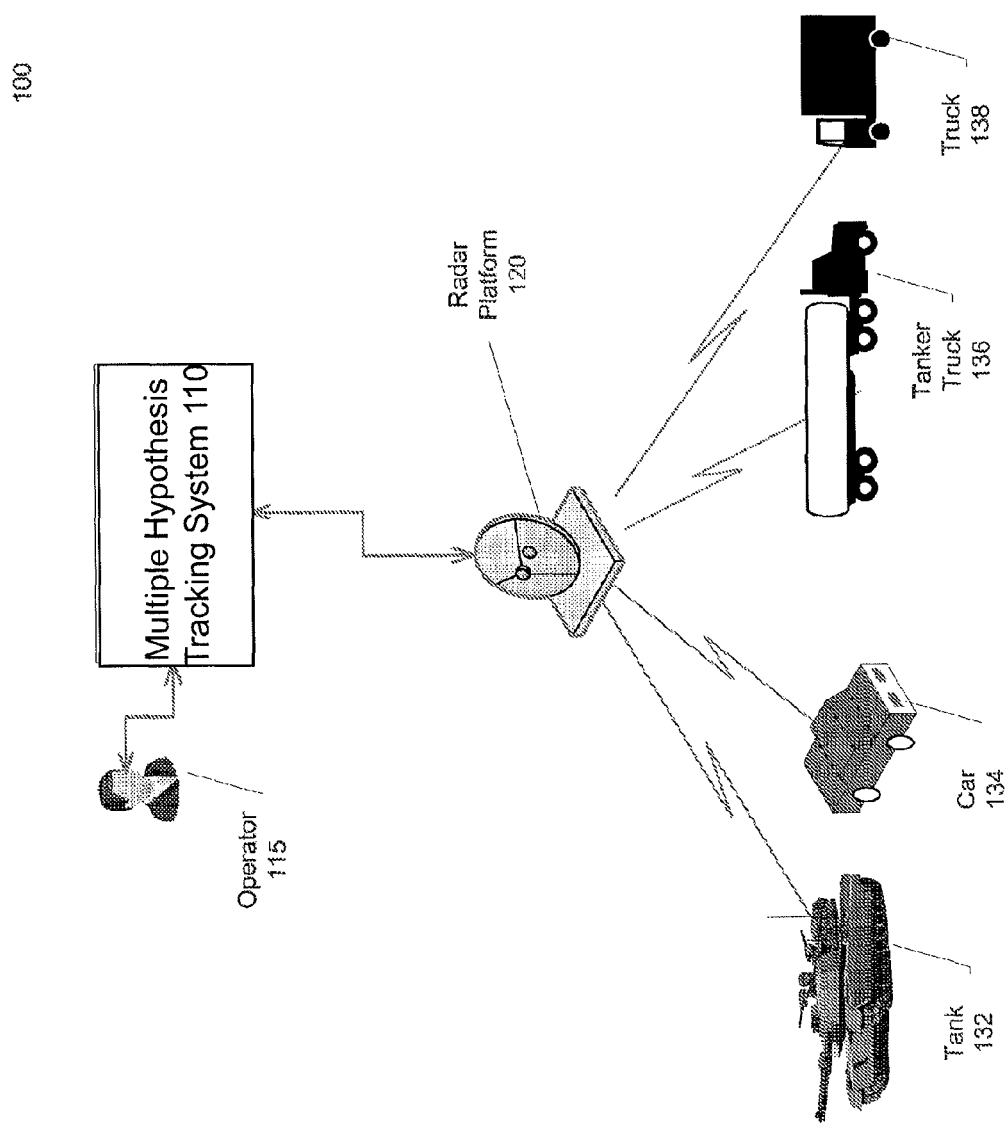
FIG. 1A is a diagram of an exemplary multiple hypothesis tracking environment.

FIG. 1A is a diagram of an exemplary multiple hypothesis tracking environment 100. The environment 100 includes a multiple hypothesis tracking system 110 and a radar platform 120. An operator 115 views and/or tracks an object (in this example, a tank 132, a car 134, a tanker truck 136, and a truck 138) utilizing the multiple hypothesis tracking system 110. The radar platform 120 transmits and/or receives electromagnetic waves to track the objects and/or a plurality of other objects (not shown). For example, the radar platform 120 transmits electromagnetic waves over a period of time and receives the reflection of the electromagnetic waves from the tank 132 over the period of time/plurality of times. The radar platform 120 communicates data (e.g., digital representation of a radar reflection of the tank 132, processed data representation of the tank 132, etc.) to the multiple hypothesis tracking system 110.

In operation, for example, the multiple hypothesis tracking system 110 receives track data (e.g., raw radar data, pre-processed radar data, etc.) from the radar platform 120. The track data can include kinematic information (e.g., speed, vector, location, etc.) associated with one or more target objects (e.g., the tank 132, the car 134, etc.). The track data can include feature likelihood information (e.g., shape, image intensity, operating conditions, etc.) associated with one or more target objects (e.g., the tank 132, the car 134, etc.).

The multiple hypothesis tracking system 110 generates one or more paired segments (e.g., target object A at time 1 and target object B at time 2; target object A at time 1 and target object C at time 2; etc.) based on the track data. Each of the one or more paired segments includes a list of one or more tracks incompatible with the paired segment (e.g., not possible based on location and speed, not possible based on time, not possible based on other factors, etc.) and a likelihood score (e.g., weighting of comparison of kinematic information and feature likelihood information, difference between the speeds, etc.). The generation of the paired segments can be independent of past and future segment associations and can be based solely on the kinematic information and the feature likelihood information. In other words, the generation of the paired segments is based on the information for the particular pairing given the past information. Further, the multiple hypothesis tracking system 110 can, in the course of processing, select a different set of past information to alter its result. The multiple hypothesis tracking system 110 may do this to receive a higher scoring result.

The multiple hypothesis tracking system 110 generates one or more multi-segment tracks based on the one or more paired segments (e.g., every combination of paired segments, every combination of paired segments with similar kinematic information, etc.). The multiple hypothesis tracking system 110 generates a transition probability between each pair of the one or more paired segments based on the list of one or more tracks incompatible with the paired segment and the likelihood score associated with each paired segment of the pair of the one or more paired segments. For example, the multiple hypothesis tracking system 110 determines if there is an incompatibility between the pair of the paired segments and if there is an incompatibility, the transition probability is 0%.

The multiple hypothesis tracking system 110 can store the short-term tracks (also referred to as the one or more paired segments and the transition probabilities for each pair). The storage of the short-term tracks by the multiple hypothesis tracking system 110 enables the addition of other segments in the same time period as the existing segments without re-generation of the long-term tracks (e.g., association of a plurality of short-term tracks, generation of the associations between short-term tracks based on transition probabilities, etc.). The multiple hypothesis tracking system 110 can generate the long-term tracks based on the transition probabilities between each pair of the paired segments (e.g., selection of the highest probability between each paired segment, selection of the highest probability at each time entry, etc.).

In some examples, each target object is a ground vehicle (e.g., tank, car, etc.), an air vehicle (e.g., blimp, plane, etc.), a space vehicle (e.g., space shuttle, satellite, etc.), and/or a water vehicle (e.g., boat, ship, submarine, etc.).

Although FIG. 1 illustrates the radar platform 120, the multiple hypothesis tracking system 110 can receive data from any type of sensor device (e.g., video, sonar, infrared, etc.). Although FIG. 1 illustrates the radar platform 120, the environment 100 can utilize any number of radar platforms (e.g., ten radar platforms, one hundred radar platforms, etc.). For example, the multiple hypothesis tracking system 110 can receive radar data from any number of radar platforms for the same object or different objects. In other examples, the radar platform 120 can include a plurality of radars and/or other types of sensor devices (e.g., video camera, motion sensor, environmental sensor, heat sensor, etc.).

Figure 1B:
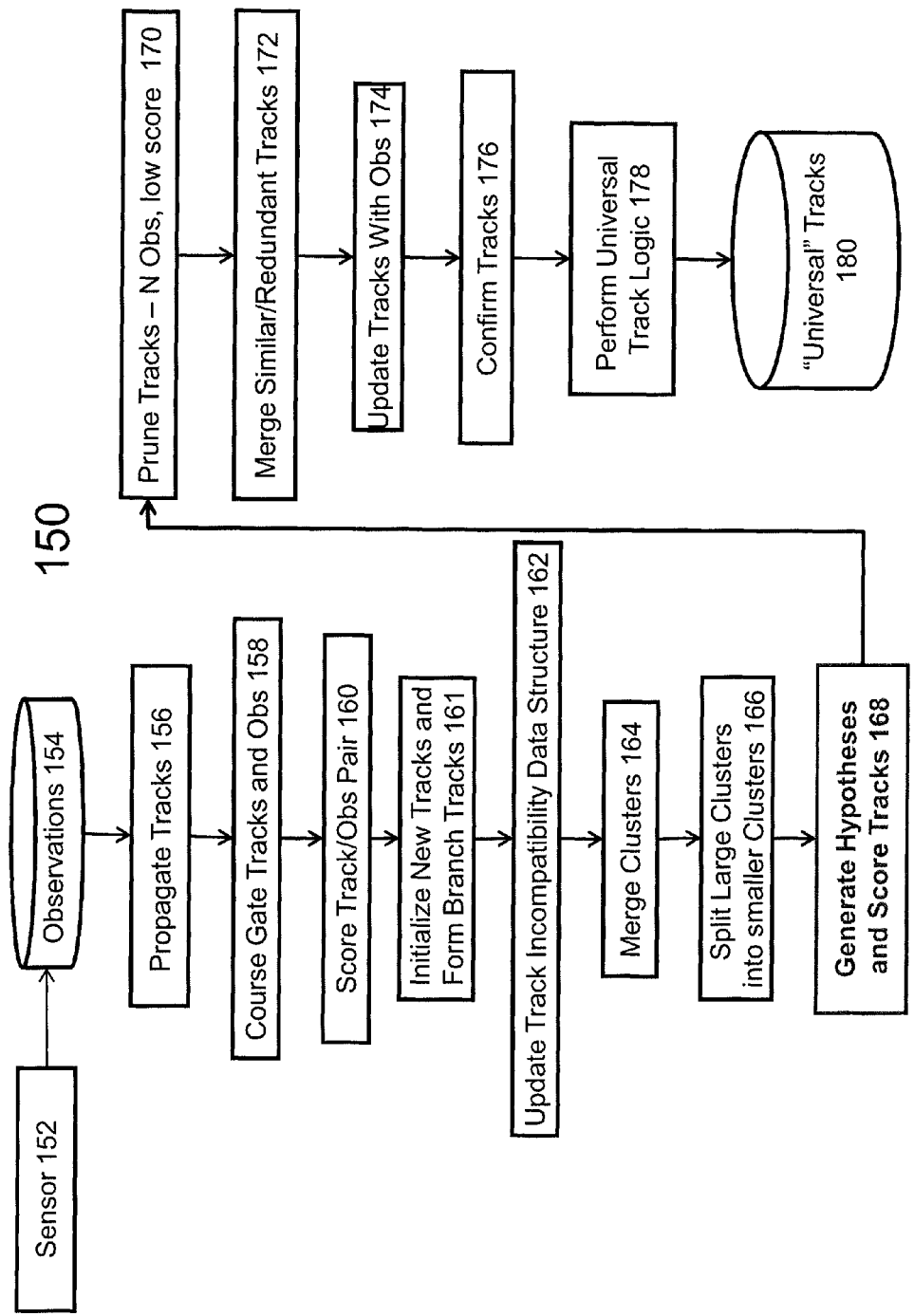
FIG. 1B is a flow diagram illustrating an example embodiment of a multiple hypothesis tracking process.

FIG. 1B is a flow diagram 150 illustrating an example embodiment of a multiple hypothesis tracking process. A sensor 152, such as a radar, although other sensors can be employed, observes data and stores the observations 154 in a memory. Based on the observations 154, the process propagates tracks having paired segments (156). The process then course gates the tracks and observations by initially pairing incoming observations with active tracks (158). The course gating (158) helps mitigate false detections. The process then scores each track and observation pair (160). Next the process initializes new tracks and forms branch tracks (161). Forming branch tracks is the process of creating a new track formed from an existing track and a measurement from the current time period. The process then updates the track incompatibility data structure, indicating which tracks are incompatible (e.g., not possible based on location and speed, time, or other factors). (160). The process then merges clusters (164) and splits large clusters into smaller clusters (166), which splits up areas of high density (lots of closely spaced tracks) into more manageable groupings/clusters.

The process then generates hypotheses and scores tracks (168). The improvements of the present disclosure occur during this part of the process. In generating hypotheses and scoring tracks, the process adds multiple tracks at a time. This allows for parallelization for generating hypotheses.

The process then prunes the tracks, which removes tracks that are low scoring or tracks which have not received updates in a given period of time (170). In embodiments, the given period of time can be fixed or user configurable. The process merges similar/redundant tracks (172), which removes potentially competing tracks that are based on the same target being detected. The process then updates tracks with the observations (174), which updates track states based on associated observations. The process then confirms tracks (176), which evaluates tracks to see if they have received a minimum number of updates and have amassed a score to find a viable target track. The process then performs universal track logic (178) by deeming the universal track to be the highest scoring track among a confirmed family of tracks. The process then stores "Universal tracks" in a memory (180) by storing the universal track information in the application's active memory space.

FIG. 2A is diagram 200 illustrating a matrix representation 202 of track incompatibility. A "1" indicates incompatibility with respectively indexed tracks, and a "0" indicates compatibility, however, other values could be substituted. By definition, tracks are incompatible with themselves. For example, track 1 is incompatible with itself. Track 1 is also incompatible with track 5 in this example. Track 1 is compatible with tracks 2, 3, 4, and 6. A person of ordinary skill in the art can also view the matrix representation 202 as track compatibility by determining the inverse of the track incompatibility.

FIG. 2B is a diagram 250 illustrating a graphical representation 252 of the track incompatibility corresponding to the matrix representation 202 of FIG. 2A. In the graphical representation, for example, track 1 is shown to be incompatible with track 5 and itself, but not with tracks 2, 3, 4, and 6. A person of ordinary skill in the art can also interpret the graphical representation 252 as track compatibility by determining the inverse of the track incompatibility.

The MWIS problem can be solved by a breadth first approach, such as "branch and bound" and other variations. (See, e.g., "Samuel Blackman and Robert Popoli, "Design and Analysis of Modern Tracking System", hereby incorporated by reference in its entirety). Branch and bound begins by selecting a central node with no constraints applied. The method sets an upper and lower bound on the problem, calculated by a "cheap" method of computation on the graph. The method branches from the central node within the computed upper and lower bound to create options. The method locks in a partial solution based on rules on how to pick which node to branch from. The method adjusts the upper and lower and bound for the branch having that partial solution. The method continues branching and adjusting the bounds until there is at least one complete solution, which is a solution having an upper and lower bound that are equal to each other.

A variation of the branch and bound method is breadth first. This method stays at one level and branches several times off the same node, each time evaluating for a better solution at the same depth. The depth of the search stays constant.

Another variation of the branch and bound method is depth first (e.g., a greedy method). The search traverses deeper into the node tree until it finds a solution.

FIG. 3 is a diagram 300 illustrating an example embodiment of expanding a hypothesis using a tree data structure, based on the track compatibility and incompatibility shown in FIGS. 2A-B. During branch and bound, at each step of the process a node of the tree data structure is expanded. In this case, a "node" represents a partial hypothesis, which is a collection of tracks. In general, branch and bound processes employ "upper bounds" (UB) to determine which node to expand next. However, the additional computation required to determine an upper bound and the upper bound's inability to tightly bound the possible solution sometimes limit its benefit for efficient tree search. Therefore, many times, as in FIG. 3 as shown, an upper bound is not calculated to increase efficiency. A node is further considered "fathomed" when no further branching from that node is possible. In the MHT context, a hypothesis is considered fathomed when a node has no remaining compatible tracks to the tracks already contained in the hypothesis. In addition, the process can add a "null track." This leaves the set as it was previously and does not change the output of the system, but is a way to proceed to another level of the tree without adding any other tracks if the tracks are not relevant.

Hypothesis 1 is represented by a node 302, which indicates it represents Track 1 (T1). Tracks 2, 3, 4, 6, (T2, T3, T4, and T6, respectively) are indicated as being compatible with Track 1, however, this information may not be stored in the node 302 itself. This track can be given a score of L1.

Node 302 is expanded to test multiple other hypotheses represented by, for example, node 304 and 306, although node 302 can be expanded to other nodes as well. Node 304, for example, represents the path of Track 1 to Track 2. Node 304 can have the score L1+L2, which is the sum of the scores of Tracks 1 and 2, respectively. Further, the compatible tracks for node 304 are now reduced to Track 4 only. Track 3 is no longer compatible because, while Track 1 is compatible with Track 3, Track 2 is not compatible with Track 3, and all tracks must be compatible to be added to the set.

Similarly, node 306 represents the path of Track 1 to Track 6. Node 306 can have a score of L1+L6, which represents the scores of Tracks 1 and 6, respectively. Further, the compatible tracks for node 306 are reduced to Track 4.

Figure 4:
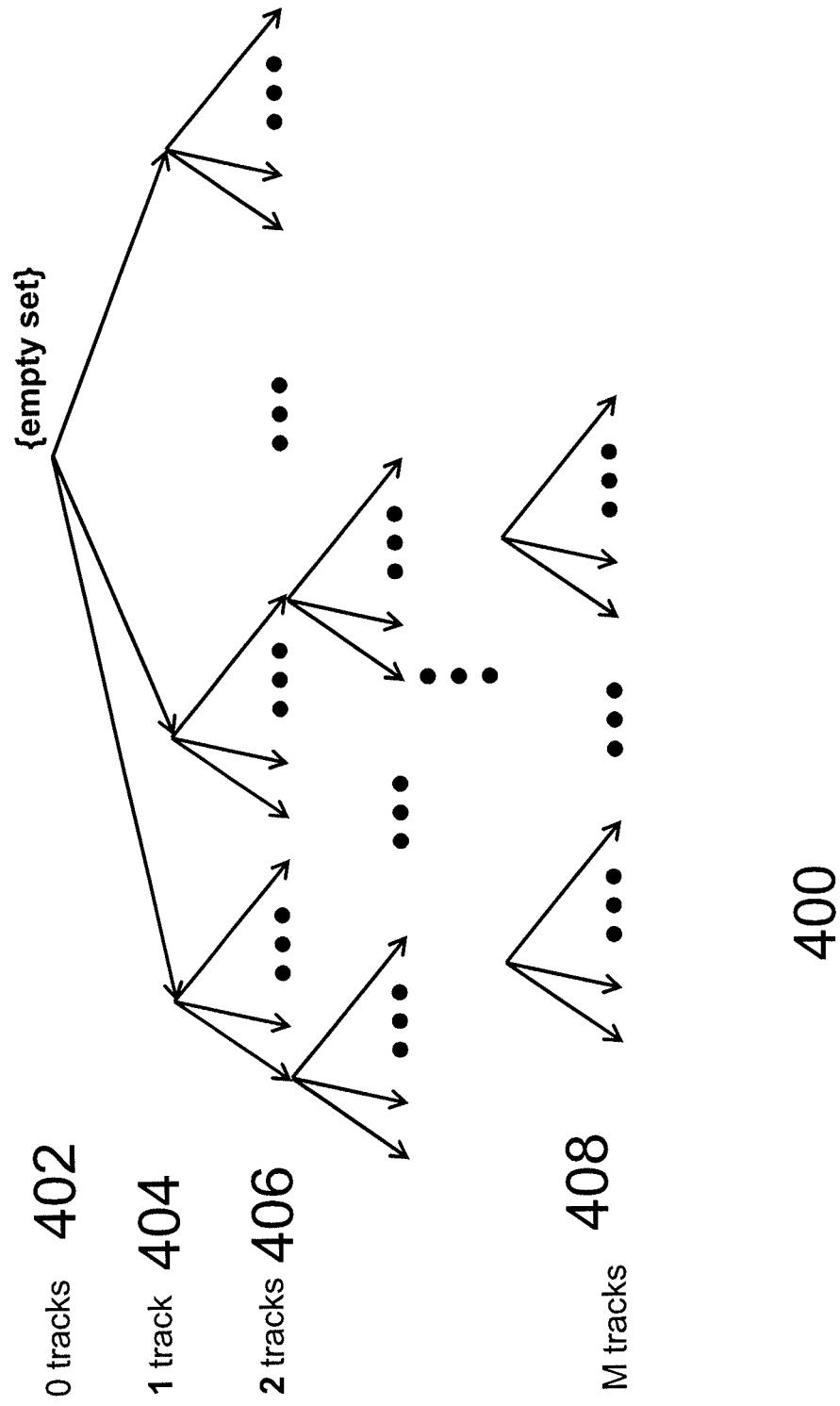
FIG. 4 is a diagram illustrating an example embodiment of further node expansion in an embodiment of the present disclosure.

FIG. 4 is a diagram 400 illustrating an example embodiment of further node expansion in an embodiment of the present disclosure. Each level of the tree in FIG. 4 represents a progression of one track. The first level 402 of the tree represents 0 tracks, or an empty set. From there, the process adds multiple first tracks to the second level 404. In other words, at each step, a set of K highest scoring hypotheses are expanded. Therefore, the second level 404 includes K nodes. Then, expanding each hypothesis can add up to K more nodes to each node of the parent level.

Expanding each hypothesis results in one more track being added to the hypothesis set. Termination criteria for the search can vary in different embodiments, but examples of termination criteria can be criteria based on the total number of hypotheses, and the lack of any further hypotheses to expand that are within a threshold score of the best hypothesis found. Suppose 30 hypotheses are expanded at each step and each expanded hypothesis tests 40 additional tracks. Each step then adds 1200 hypotheses.

These previous solutions move by one track at a time. In an embodiment of the present disclosure, the method adds at least two tracks at a time. A problem when adding more than one item at a time in a search is that these items may be incompatible with themselves. Therefore, the present disclosure further describes methods of ensuring that the multiple tracks added to the search are compatible.

However, adding more than one track at a time provides the advantage of parallelizing the search among multiple processors, instead of being constrained by one processor, as in previous methods. In an embodiment, one coordinating processor and multiple worker processors can distribute the work of the search, and increase the speed of the processing.

In an example, suppose an input is a list of 20 compatible tracks. The search needs to determine which two tracks to add. First, the method has to check to be sure that any two tracks added are compatible with themselves. For example, (a) is track 1 compatible with track 2, (b) is track 2 compatible with track 3, (c) is track 1 compatible with track 3, etc. From this test, the method forms a list of sets of K that are compatible with themselves. The method then scores each set in the list. The method of scoring can vary, but one method is to sum the scores of the individual elements. The method then selects the K highest scoring sets of the list of sets that are compatible with themselves and the set. The method then branches K times onto that one node. The method then returns the best K sets.

The organizing processor can direct the worker processors (e.g., GPUs) to do the work. Alternatively, the worker processors can form their own sets alternatively. The worker processors test and score the sets and return the best K sets.

The embodiments of the present invention are analogous to a look-ahead algorithm. The present method is a pseudo-look ahead method that simultaneously adds one level deep and another level deeper.

Figure 5:
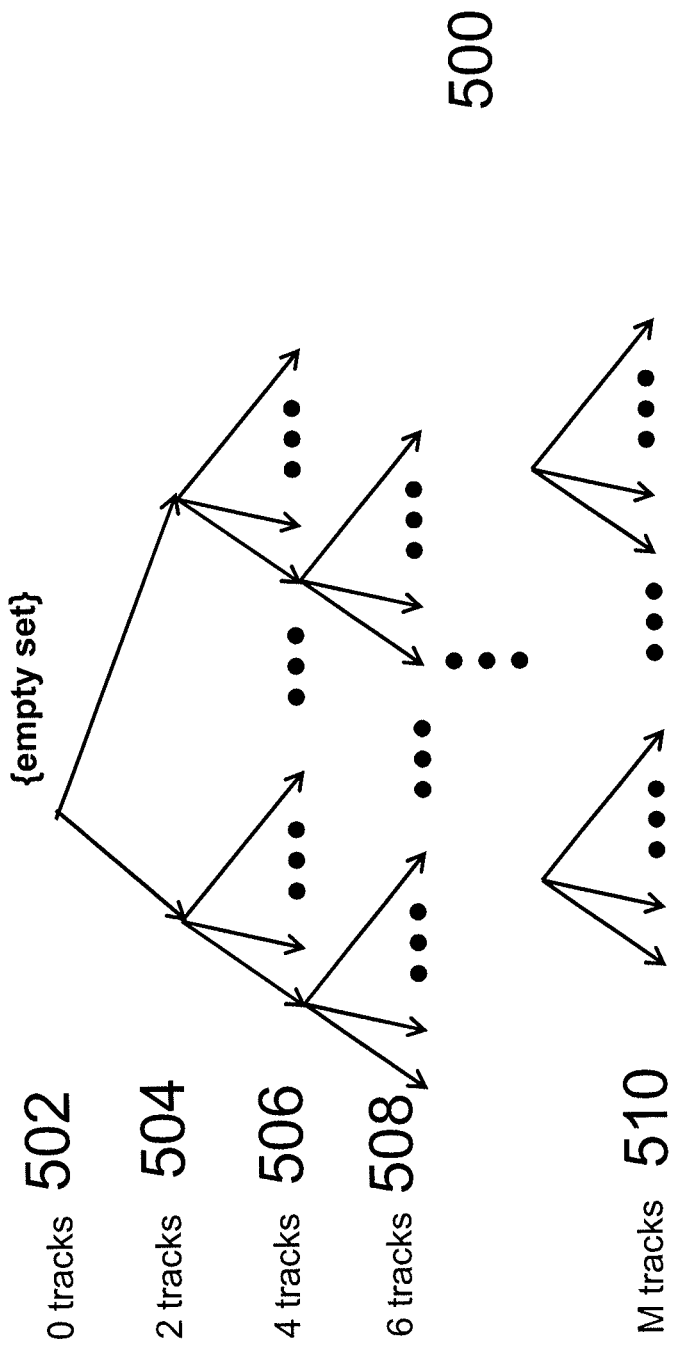
FIG. 5 is diagram illustrating an example embodiment of such a multi-step expansion.

FIG. 5 is diagram 500 illustrating an example embodiment of such a multi-step expansion. As in FIG. 4, the tree in FIG. 5 begins with a first level 502 having an empty set. However, as the tree expands, each level has two tracks added at a time. For example, a second level 504 has nodes representing two tracks being added, a third level 506 has nodes representing four total tracks being added, and a fourth level 508 has nodes representing six total tracks being added. An Mth level 510 has nodes representing (M−1)*2 total tracks being added.

The resulting tree is narrower than one step expansion approach of previous methods. At each step a set of K highest scoring hypotheses are expanded. Expanding each hypothesis results in two more tracks being added to the hypothesis set, instead of one. Suppose 30 hypotheses are expanded at each step, and each expanded hypothesis takes the top 10 track pairs. Each step then adds 300 hypotheses. In this embodiment the multi-step expansion therefore requires half as many steps (e.g., only steps 0, 2, 4, 6, 8, . . . M) to be performed and fewer hypotheses to be maintained.

Figure 6:
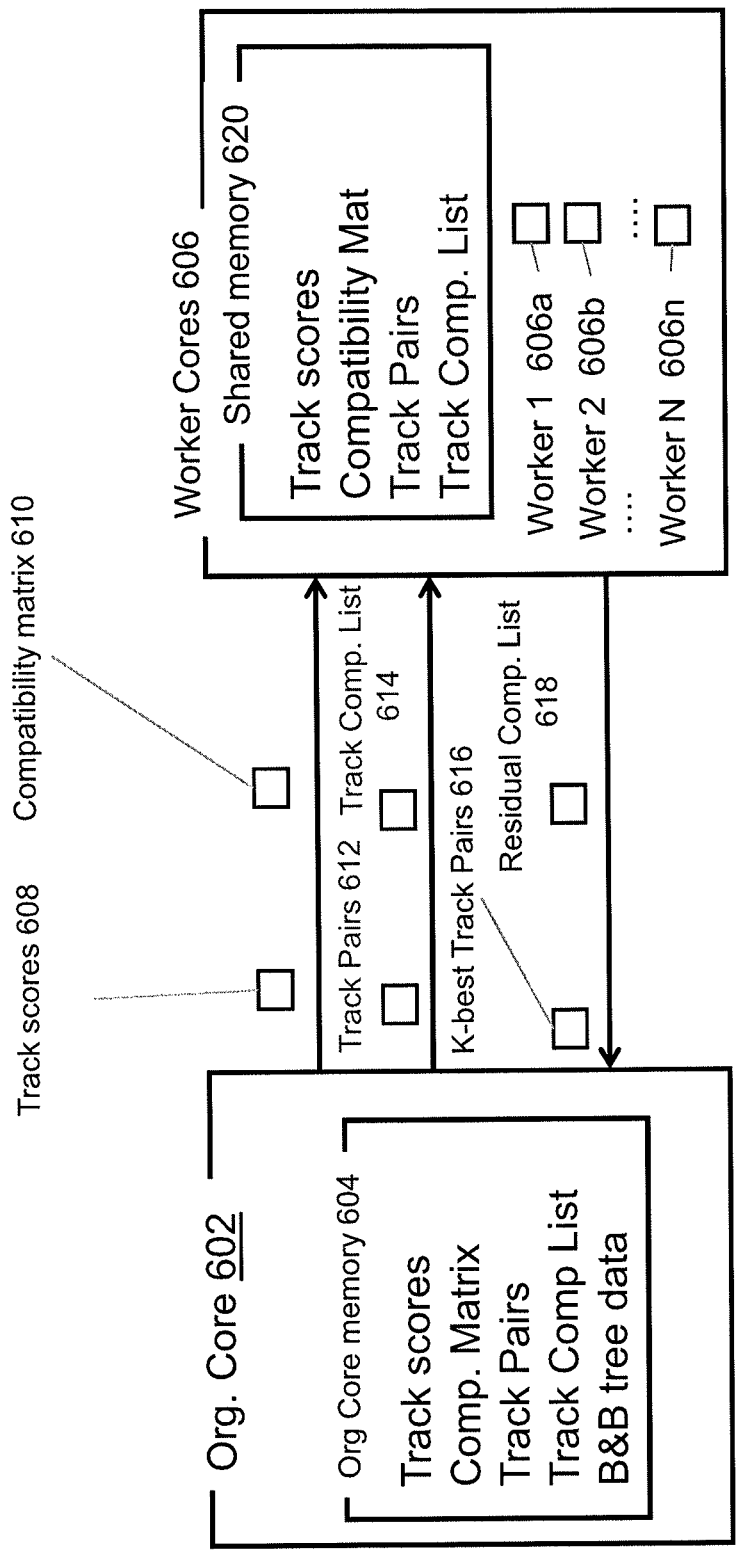
FIG. 6 is a block diagram illustrating an example embodiment of a system implementing the present disclosure.

FIG. 6 is a block diagram 600 illustrating an example embodiment of a system implementing the present disclosure. An organizing core 602 (e.g., processor) having an organizing core memory 604 is operatively coupled to worker cores 606 having a plurality of workers 606*a-n* and a shared memory 620.

The organizing core memory 604 stores track scores, a compatibility matrix (or other data structure), a list of track pairs, a track compatibility list, and branch and bound tree data. The organizing core 602 sends the track scores 608, compatibility matrix 610, track pairs 612, and track compatibility list 614 to the worker cores 606. The worker cores 606 store the track scores 608, compatibility matrix 610, track pairs 612, and track compatibility list 614 in the shared memory 620. Each of the workers 606*a-n* is assigned a particular node of the tree to work on. Each of the workers 606*a-n* accesses the shared memory 620 and calculates a score for the assigned node, the K-best track pairs 616 for the node and a residual compatibility list 618 for each node.

The organizing core 602 directs the worker cores 606 to do work on a particular assigned node. In an embodiment, the organizing core 602 determines the compatibility matrix 610 and track compatibility list 614 in order to distribute work to the worker cores 606. (In other embodiments, however, the worker cores 606 can determine the compatibility matrix 610 and track compatibility list 614.) The organizing core 604 requests the worker cores 606 to return the K-best expansions of a node from an M-step expansion. Upon receiving each set of expansions from the worker cores 606, the organizing core 604 can update the list of track pairs, track compatibility list, and branch and bound tree data stored in its memory 606. The organizing core 604 then can either determine whether a solution has been found or send out more work to the worker cores 606 to process.

The node expansion in the present method, instead of expanding one level, expands by two or more levels. While this is a more difficult computational problem, the system utilizes parallel processors to aid with the computation. Utilizing multiple worker cores 606 to perform the scoring parallelizes the node expansion of the process and increases the speed of the process to allow it to be practical.

The organizing core 602 can be, for example, a central processing unit (CPU) or other processors. The worker cores 606a-n can be, for example, graphical processing units (GPUs) or other processors such as CPUs, or multiple cores of one or more processor unit. In another embodiment, the system can be implemented in a distributed computing architecture over a cloud. An organizing core 602 can be one of the distributed computers in the network, which distributes work to other computers, serving as the workers 606a-n. Each computer independently performs its task and returns its work, over the network, to the organizing core 602.

In an embodiment, the organizing core 604 and worker cores 606a-n can use the SIMD (Single Instruction, Multiple Data) architecture.

The above described design further provides advantages by providing an organizing memory 604 for the organizing core 602 and a share memory 620 for the workers 606a-n. For each computation, the workers 606a-n access common data, such as the compatibility matrix, so a common memory 620 can reduce the amount of hardware resources required.

Figure 7:
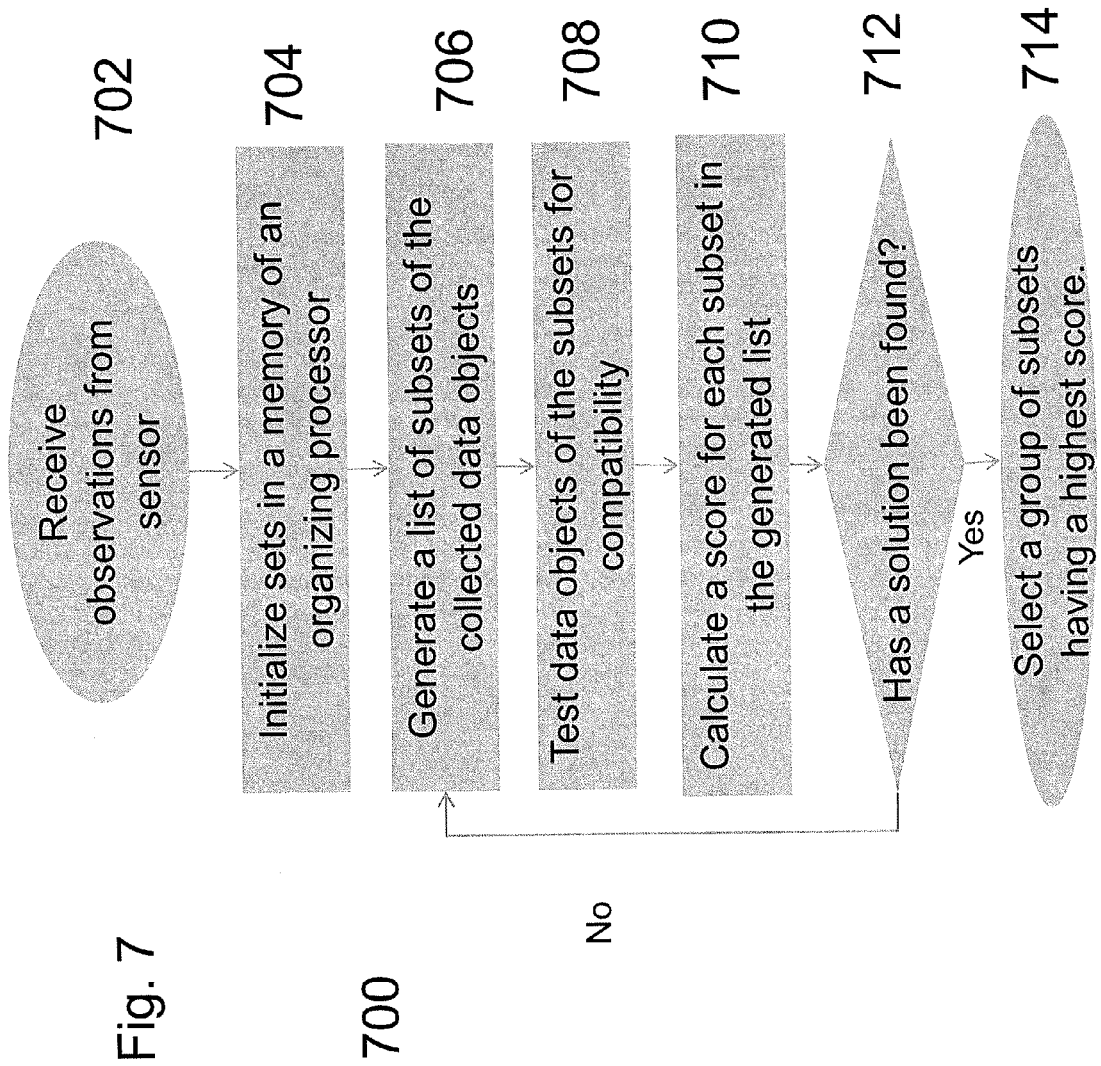
FIG. 7 is a flow diagram illustrating an example embodiment of a process employed by the present disclosure.

FIG. 7 is a flow diagram 700 illustrating an example embodiment of a process employed by the present invention. The process first receives observations from a sensor (702). The sensor can be any sensor as described above, including a radar or sonar. Based on the observations, the system initializes sets of the observations in a memory of an organizing processor.

Based on the data initialized in the memory, the process then proceeds to find an optimal solution based on the data. The process then, at a plurality of parallel processors, generates a list of subsets of the collected data objects (706). Each list can be generated by a corresponding one of the plurality of parallel processors. The process then tests the data objects of the subsets for compatibility (708). Each processor tests a corresponding subset for compatibility. The process then calculates a score for each subset in the generated list at a corresponding processor of the plurality of parallel processors (710). The system then determines whether a solution has been found (712), for example by determining whether more nodes can be added to the tree. If so, the system selects a group of subsets having a highest score (714). If not, the system then generates additional lists of subsets of the collected data objects (706) and repeats.

The above method can further be applied to other contexts other than MHT. For example, the above method can be applied to solve any version of the restricted knapsack problem. The above method can find any optimal set within a set of data, regardless of context. MHT is one application of finding an optimal set, however.

In an embodiment of the MHT application, based on the optimal set found by the process, the process can further adjust the sensor or radar to more optimally track the desired objects.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation, and Google Chrome® available from Google Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A multiple hypothesis tracking method of finding an optimal set within target track data objects, each particular target track data object based on collected sensor data and having a likelihood score and a list of target track data objects that are incompatible with that particular target track data object, the method comprising:
   by a hardware processor:
     initializing a plurality of target track partial hypothesis sets in a memory, each target track partial hypothesis set having one or more compatible target track data objects and an associated likelihood score;
     raisin the likelihood scores of the plurality of target track partial hypothesis sets by repeatedly adding multiple compatible target track data objects to the plurality of target track partial hypothesis sets, the compatible target track data objects tested in parallel in multiple expanded target track hypotheses by a plurality of processors by:
       (a) at each of the plurality of processors, generating a list of expanded target track hypotheses by loading a list of the target track partial hypothesis sets from a memory and testing pairs of target track data objects for compatibility for each target track partial hypothesis set, and
       (b) calculating a score for each expanded target track hypothesis in the generated list, each one of the plurality of processors calculating the score for a particular expanded target track hypothesis in the generated list in parallel; and
     selecting a group of the expanded target track hypotheses having a highest score.

2. The method of claim 1, further comprising returning a particular number of highest scoring expanded target track hypotheses.

3. The method of claim 1, wherein the group of selected expanded target track hypotheses is a group of two or more expanded target track hypotheses.

4. The method of claim 1, further comprising, from the hardware processor, sending each target track partial hypothesis set to a particular one of the plurality of processors to score.

5. The method of claim 1, further comprising, by each one of the plurality of processors, retrieving from the memory a particular expanded target track hypothesis to score.

6. The method of claim 1, further comprising:
   collecting the sensor data from one of the group of a radar, an infra-red sensor, an electrical-optical sensor, an acoustic sensor, and a sonar detecting at least one target object, the data representing locations of the at least one target object.

7. The method of claim 1, wherein the plurality of processors share a common read-only memory for the data scores and compatibility lists.

8. A system for use in a multiple hypothesis tracking apparatus for finding an optimal set within target track data objects, each particular target track data object based on collected sensor data and having a likelihood score and a list of target track data objects that are incompatible with that particular target track data object, the system comprising:
   an initialization module configured to initialize a plurality of target track partial hypothesis sets, each target track partial hypothesis set having one or more compatible target track data objects and an associated likelihood score;

a score optimization module having a plurality of processors configured to raise the likelihood scores of the plurality of target track partial hypothesis sets by repeatedly adding multiple compatible target track data objects to the plurality of target track partial hypothesis sets, wherein the score optimization module tests the compatible target track data objects in parallel expanded target track hypotheses by a plurality of processors by:
  (a) at each of the plurality of processors, generating a list of expanded target track hypotheses by loading the list of the target track partial hypotheses sets from a memory and testing pairs of target track data objects for compatibility with a plurality of hardware processors, for each target track partial hypothesis set, and
  (b) calculating a score for each expanded target track hypothesis in the generated list, each one of the plurality of processors calculating a score for a particular expanded target track hypothesis in the generated list in parallel; and a group selection module configured to select a group of the expanded target track hypotheses subsets having a highest score.

9. The system of claim 8, further comprising an output module configured to return a particular number of highest scoring expanded target track hypotheses.

10. The system of claim 8, wherein the group of selected expanded target track hypotheses is a group of two or more expanded target track hypotheses.

11. The system of claim 8, further comprising:
a core processor configured to send each target track partial hypothesis set to a particular one of the plurality of processors to score.

12. The system of claim 8, wherein each one of the plurality of processors is configured to retrieve from the memory a particular expanded target track hypothesis to score.

13. The system of claim 8, further comprising:
at least one of a radar, infra-red sensor, electrical-optical sensor, acoustic sensor and sonar operational to detect at least one target object and to collect the sensor data, the sensor data representing locations of the at least one object.

14. The system of claim 8, wherein the plurality of processors share a memory.

15. A non-transitory computer-readable medium having computer-readable program codes embedded thereon including instructions for causing a processor to execute a multiple hypothesis tracking method of finding an optimal set within target track data objects, each particular target track data object based on collected sensor data and having a likelihood score and a list of target track data objects that are incompatible with that particular target track data object, cause the one or more processors to:
  initialize a plurality of target track partial hypothesis sets in a memory, each target track partial hypothesis set having one or more compatible target track data objects and an associated likelihood score;
  raise the likelihood scores of the plurality of target track partial hypothesis sets by repeatedly adding multiple compatible target track data objects to the plurality of target track partial hypothesis sets, the compatible target track data objects tested in parallel in multiple expanded target track hypotheses by a plurality of the one or more processors by:
    (a) at each of the plurality of processors, generating a list of expanded target track hypotheses by loading a list of the target track partial hypothesis sets from a memory and testing pairs of target track data objects for compatibility for each target track partial hypothesis set, and
    (b) calculating a score for each expanded target track hypothesis in the generated list, each one of the plurality of processors calculating the score for a particular expanded target track hypothesis in the generated list in parallel; and
  select a group of the expanded target track hypotheses having a highest score.

16. The non-transitory computer readable medium of claim 15, further comprising returning a particular number of highest scoring expanded target track hypotheses.

17. The non-transitory computer readable medium of claim 15, wherein the group of selected expanded target track hypotheses is a group of two or more expanded target track hypotheses.

18. The non-transitory computer readable medium of claim 15, wherein the instructions further include sending, from a core processor, each target track partial hypothesis set to a particular one of the plurality of processors to score.

* * * * *